(12) United States Patent
Ragnarsson

(10) Patent No.: US 11,326,779 B2
(45) Date of Patent: May 10, 2022

(54) TWO COMPONENT CHAR AND BIOCHAR COMBUSTION/PYROLIZATION SYSTEM

(71) Applicant: Anders Ragnarsson, Chester, NH (US)

(72) Inventor: Anders Ragnarsson, Chester, NH (US)

(73) Assignee: TIGERCAT INDUSTRIES INC., Brantford (CA)

( * ) Notice: Subject to any disclaimer, the term of this patent is extended or adjusted under 35 U.S.C. 154(b) by 217 days.

(21) Appl. No.: 16/686,904

(22) Filed: Nov. 18, 2019

(65) Prior Publication Data

US 2021/0148570 A1    May 20, 2021

(51) Int. Cl.
| | |
|---|---|
| *F23G 7/10* | (2006.01) |
| *F23L 9/06* | (2006.01) |
| *F23G 5/34* | (2006.01) |
| *F23G 5/40* | (2006.01) |

(52) U.S. Cl.
CPC .............. *F23G 7/105* (2013.01); *F23G 5/34* (2013.01); *F23G 5/40* (2013.01); *F23L 9/06* (2013.01)

(58) Field of Classification Search
CPC ... F23G 5/40; F23G 2203/60; F23G 2203/601
See application file for complete search history.

(56) References Cited

U.S. PATENT DOCUMENTS

| | | | | |
|---|---|---|---|---|
| 271,763 A | * | 2/1883 | Anson ................. | B29C 66/1122 432/224 |
| 3,371,629 A | | 3/1968 | Engdahl et al. | |
| 3,682,115 A | * | 8/1972 | Rodgers ................... | F23G 5/40 110/222 |
| 3,703,070 A | * | 11/1972 | Pasichnyk .............. | F23J 15/025 55/526 |

(Continued)

FOREIGN PATENT DOCUMENTS

JP         H04-86406         3/1992

OTHER PUBLICATIONS

Written Opinion filed in corresponding PCT Application No. PCT/US2019/020722 dated May 7, 2019.

(Continued)

*Primary Examiner* — David J Laux
(74) *Attorney, Agent, or Firm* — Finch & Maloney PLLC; Michael J. Bujold; Jay S. Franklin

(57) ABSTRACT

A combustion/pyrolization system for generating at least one of char and biochar comprising an upper base frame supporting a combustion/pyrolization housing, and the combustion/pyrolization housing having both an open top end and an open bottom end. A char collection bin defining a collection chamber therein and a perforated grate normally covering the open top end of the char collection bin. The perforated grate being sized so as to permit desired sized char and/or biochar to pass therethrough into the collection chamber. The open bottom end of the combustion/pyrolization housing of the upper base frame is movable into an engaged position where the combustion/pyrolization housing partially receives and surrounds the perforated grate and defines a combustion/pyrolization chamber for receiving and consuming feed material. The upper base frame is movable out of engagement with the perforated grate to facilitate movement of the perforated grate and removal of the generated char and/or biochar.

19 Claims, 11 Drawing Sheets

(56) References Cited

U.S. PATENT DOCUMENTS

| | | | | |
|---|---|---|---|---|
| 3,785,302 A | * | 1/1974 | Davis | F23G 5/40 110/215 |
| 3,785,303 A | * | 1/1974 | Hopkins | F23G 5/40 110/215 |
| 3,859,934 A | * | 1/1975 | Weholt | F23G 5/40 110/203 |
| 4,452,611 A | | 6/1984 | Richey | |
| 4,730,564 A | * | 3/1988 | Abboud | F23G 5/40 110/240 |
| 4,756,258 A | | 7/1988 | Gilbert | |
| 4,829,913 A | | 5/1989 | Priebe et al. | |
| 5,415,113 A | * | 5/1995 | Wheeler | F23G 7/105 110/241 |
| 6,352,040 B1 | * | 3/2002 | Voorhees | F23G 5/16 110/211 |
| 2003/0033966 A1 | * | 2/2003 | O'Connor | F23L 5/02 110/341 |
| 2005/0011424 A1 | * | 1/2005 | Ford | F23M 5/00 110/346 |
| 2006/0027150 A1 | * | 2/2006 | O'Connor | F23G 5/34 110/346 |
| 2007/0144412 A1 | * | 6/2007 | O'Connor | F23G 5/40 110/241 |
| 2009/0211501 A1 | * | 8/2009 | O'Connor | F23G 5/40 110/240 |
| 2011/0165524 A1 | * | 7/2011 | Suljak | F23G 5/00 431/2 |
| 2012/0137582 A1 | | 6/2012 | Graham et al. | |
| 2012/0235423 A1 | * | 9/2012 | O'Connor | F23G 5/46 290/1 R |
| 2013/0276723 A1 | | 10/2013 | Higgins et al. | |
| 2014/0261374 A1 | * | 9/2014 | Lubanowski | F23G 5/245 126/224 |
| 2018/0010043 A1 | * | 1/2018 | Archuleta, Jr | C05G 3/00 |
| 2018/0317706 A1 | * | 11/2018 | Graves | A23L 5/10 |
| 2019/0277495 A1 | * | 9/2019 | Ragnarsson | F23G 5/40 |
| 2019/0316772 A1 | * | 10/2019 | Ragnarsson | F23G 7/105 |

OTHER PUBLICATIONS

International Search Report filed in corresponding PCT Application No. PCT/US2019/020722 dated May 7, 2019.

Written Opinion filed in corresponding PCT Application No. PCT/US2019/027482 dated Jun. 25, 2019.

International Search Report filed in corresponding PCT Application No. PCT/US2019/027482 dated Jun. 25, 2019.

* cited by examiner

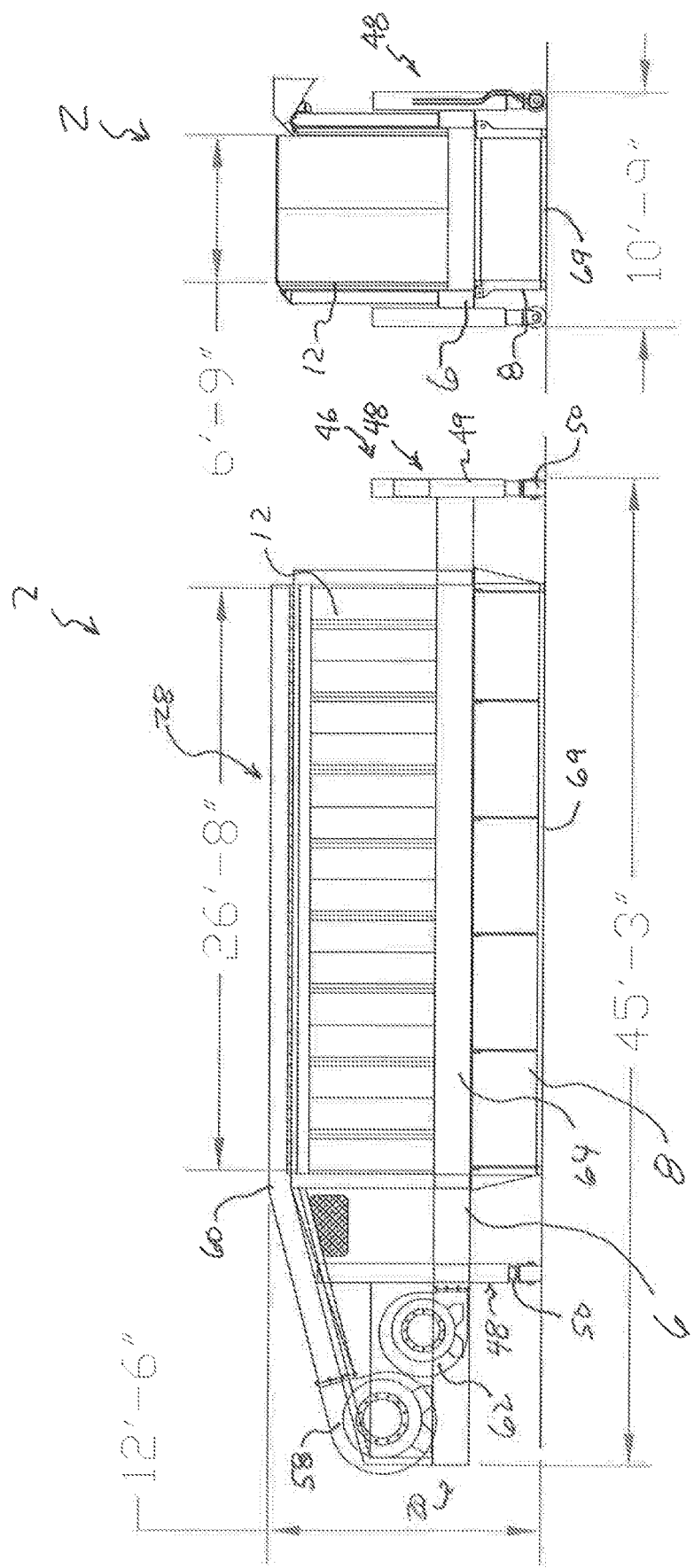

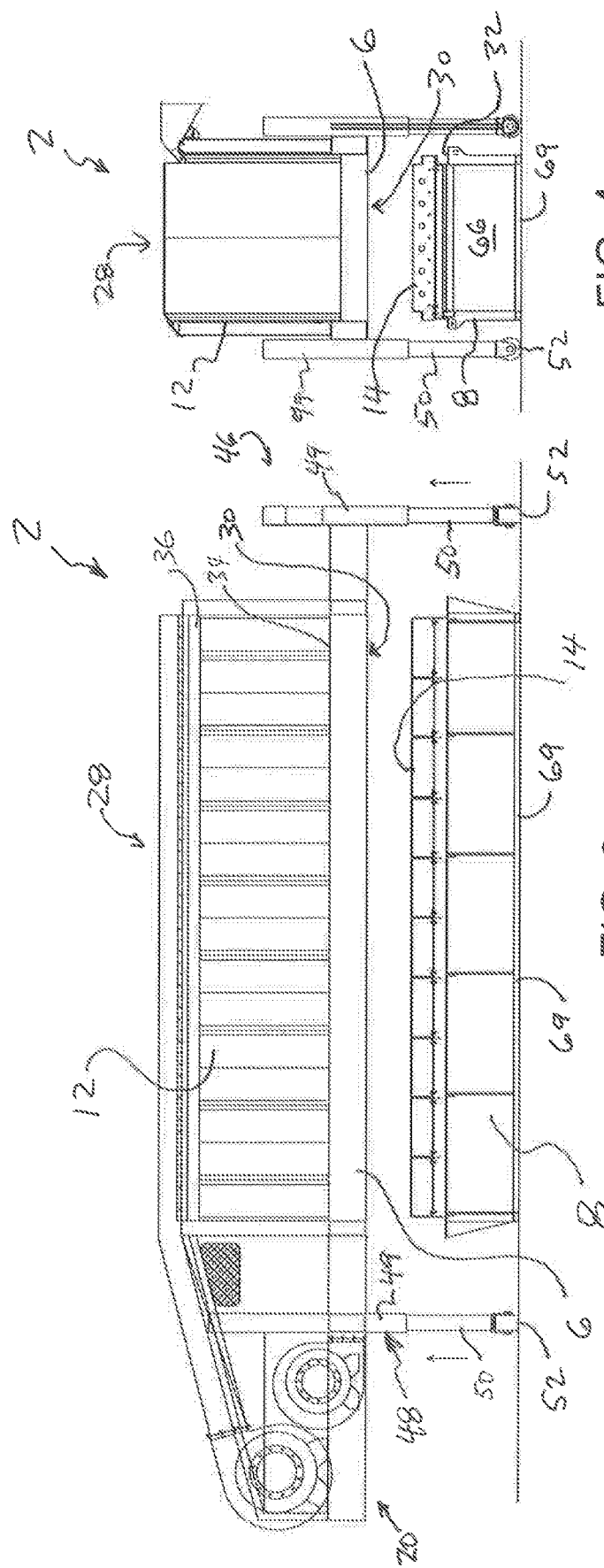

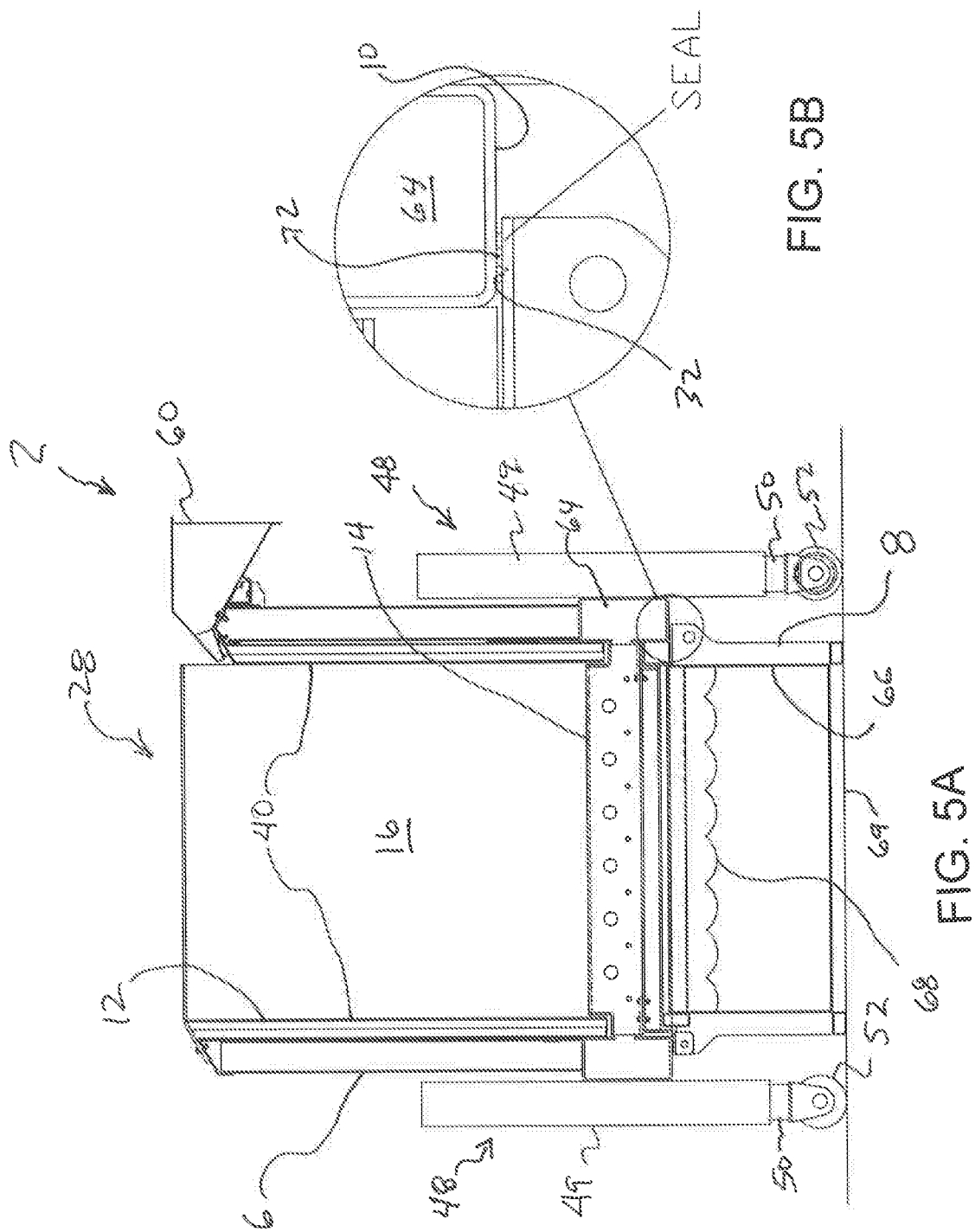

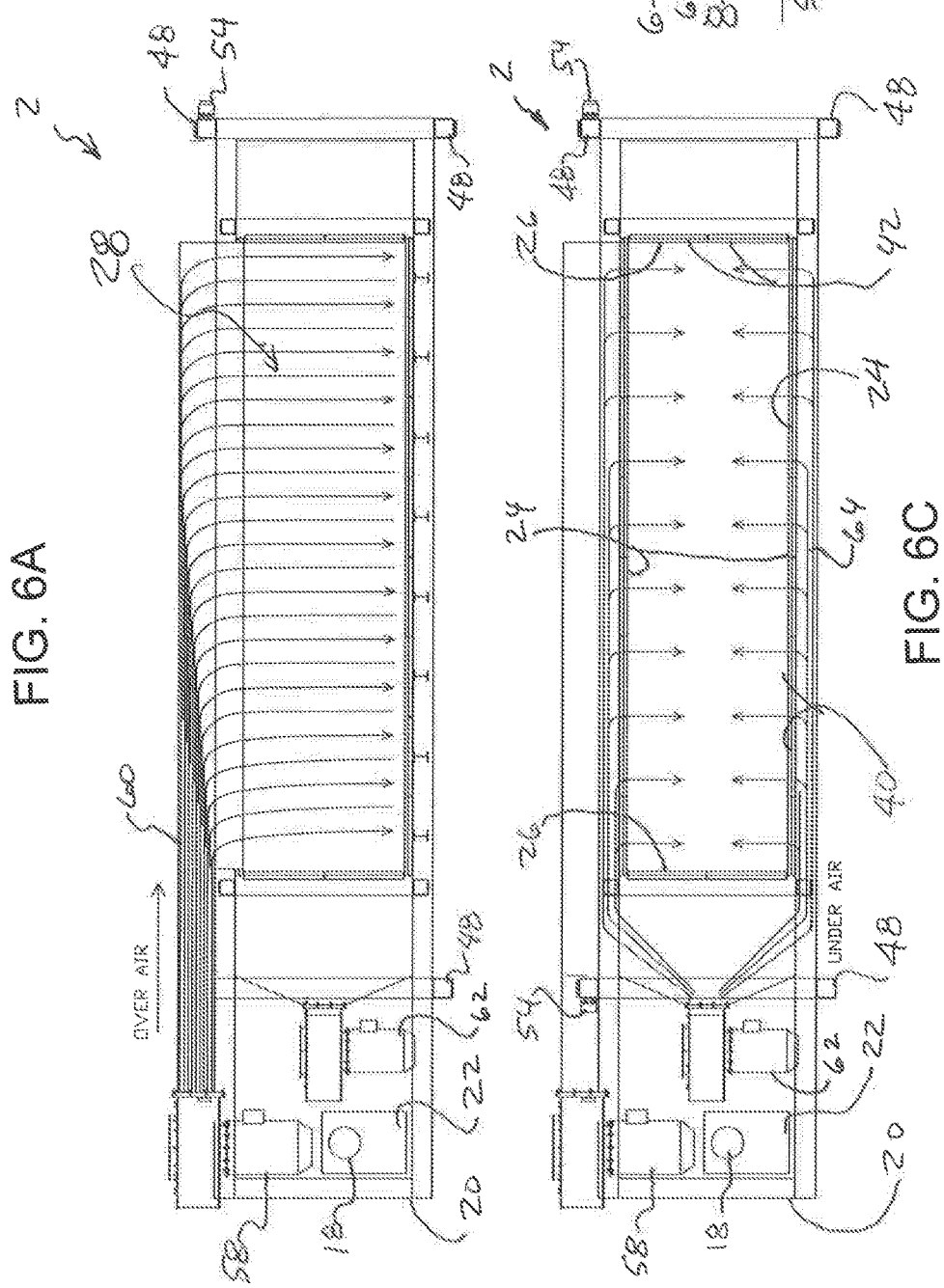

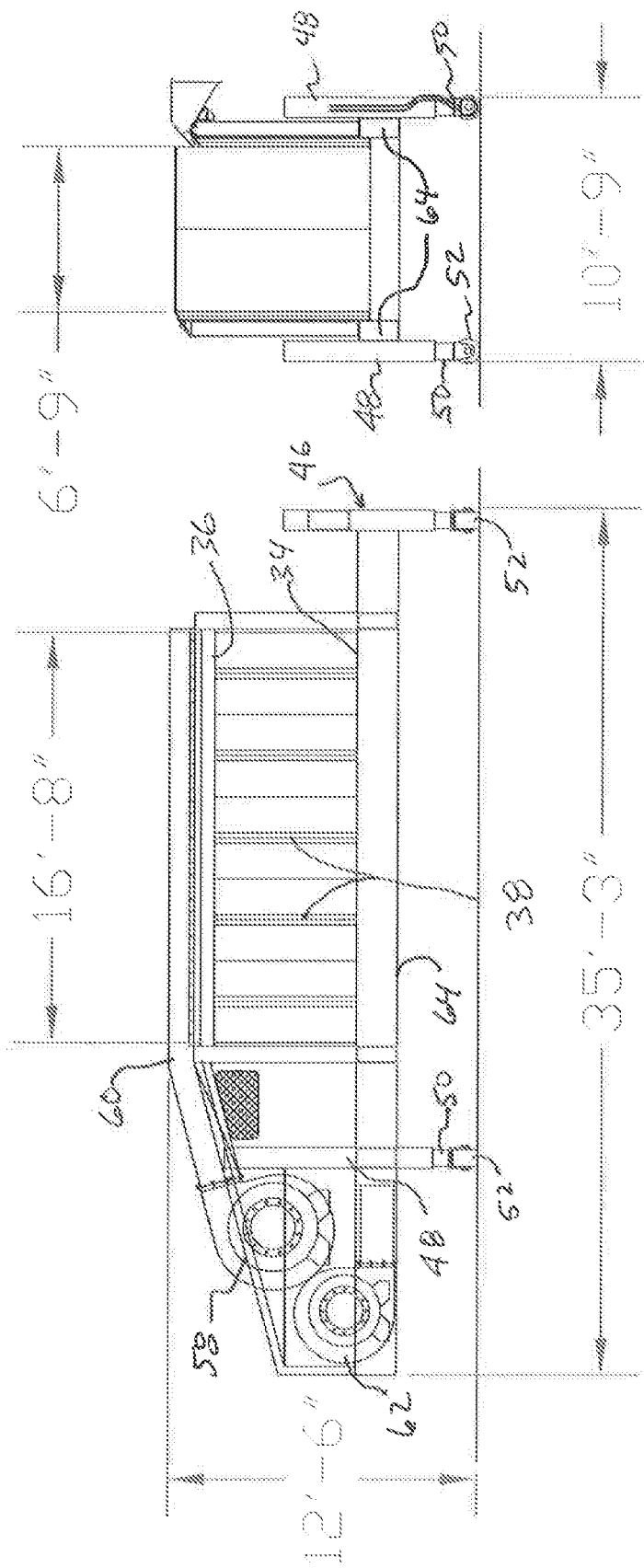

TWO COMPONENT CHAR AND BIOCHAR COMBUSTION/PYROLIZATION SYSTEM

FIELD OF THE INVENTION

The present invention relates to a combustion/pyrolization system which has both first and second sources of aft, and is designed to pyrolize all types of material, such forestry debris, vegetative debris, biomass, processed and unprocessed wood, chips, bark, ground wood and well as other materials such municipal solid waste (MSW), all of which is hereinafter referenced to as "feed material" into desired char and/or biochar.

BACKGROUND OF THE INVENTION

Vegetative material, in particular wood, has long been a difficult problem for community landfills, lumbering operations and cleanup operations after a natural disaster. Grinding wood reduces its volume, but is relatively expensive and can be harmful to the environment, and, in any event, it still fails to reduce the amount of wood. Moreover, in the context of a massive tree kill, due to insect infestation and/or climate change, for example, the approach of grinding, chipping and hauling the wood does not solve, but can actually spread the problem.

Fireboxes and fire pits have been used to burn vegetative material at clearing sites. In order to reduce ash and smoke released during material incineration (particulate release), a flow of high velocity air has been used to provide an "air curtain" over a fire pit or firebox in which the material is burned. U.S. Pat. Nos. 4,756,258 and 5,415,113 describe portable apparatus for air curtain incineration. The former patent relates to a fan and manifold assembly that can be towed to and positioned at the edge of a fire pit, whereas the latter patent relates to a firebox, fan, and manifold assembly mounted on a support frame for transport to a desired clearing site for incineration of material without the need to dig a fire pit. These portable solutions offer relatively dean burning and also minimize the need to transport the material, however, they both still suffer from a number of associated drawbacks, e.g., the material is completely burnt thereby releasing into the atmosphere the carbon contained in that material.

It is to be appreciated that currently available fireboxes and fire pits are typically costly to move or transport from one job site to another job site. In addition, it is typically tedious and time-consuming to move a firebox or a fire pit from one location, on a job site, to another different location, on the same or a different job site. Lastly, the currently available fireboxes and fire pits typically require either a crane to lift the firebox or fire pit onto a trailer or a very specialized trailer in order to facilitate transport of currently available fireboxes and fire pits from one job site or location to another job site or location. Further, such repositioning often includes required assembly effort and time when arriving at a new job site. This is a serious drawback concerning the currently available fireboxes and fire pits.

Trench burners tend to be somewhat easier to move, along a roadway, from one job site to another job site due their relatively compact size. However, trench burners typically require preparation work to be performed at the job site, such as digging a ditch in order to accommodate the trench burner.

In addition, the currently available trench burners, fireboxes and fire pits do not have any system for automatically removing the char, biochar, ash, clinkers, soot, unburnt debris, etc., which eventually accumulate within the combustion chamber while burning the vegetative material and/or biomass. Accordingly, removal of the char, biochar, ash, clinkers, soot, unburnt debris, etc., tends to be a dirty, cumbersome, tedious, and time-consuming exercise. In addition, since the material remains within the trench burners, fireboxes and fire pits for prolonged periods of time, the material is generally completely burned thereby releasing all of the carbon contained within the material into the atmosphere.

Moreover, the currently available trench burners, fireboxes and fire pits typically lack an adequate supply of combustion air to the combustion chamber, particularly the lower portion of the combustion chamber. This lack of adequate combustion air inhibits efficient combustion, whether to completion or as an initial step in the pyrolysis process, of the vegetative material and/or biomass within conventional burners, fireboxes and fire pits.

Further, the currently available trench burners, fireboxes and fire pits are typically not equipped with any automated or semi-automated ignition system which facilitates igniting the vegetative material and/or biomass contained within the combustion chamber. Accordingly, one typical technique for commencing burning of the vegetative material and/or biomass is to add an excessive amount of an accelerant, such as diesel fuel or some other readily combustible fuel, to the vegetative material and/or biomass and then ignite the accelerant in order to commence combustion of the vegetative material and/or biomass. Such technique is generally an inconvenient way of igniting the vegetative material and/or biomass and may possibly create a potentially dangerous or hazardous situation.

Even with the recent advances which have occurred in the art, biomass incineration facilities and/or portable apparatuses still suffer from a number of associated drawbacks. Accordingly, there still remains a need for a vegetative material and/or biomass combustion apparatus that can be easily setup at a temporary location and operated until the material transportation costs become too high and, thereafter, the combustion apparatus can be easily moved or relocated to another location, at the same job site or to a new job site, for further use. The combustion system should not require any fuel(s) to supplement or augment the combustion/pyrolysis process (other than the fuel required to commence ignition of the vegetative material and/or biomass), and the combustion system should accept substantially 100% of the vegetative material and/or biomass substantially without the need to process the same before such vegetative material and/or biomass is placed in the combustion chamber for combustion. Lastly, the combustion system should be designed to either periodically, or continuously, discharge of char, biochar, ash, clinkers, soot, unburnt debris, etc., from the combustion chamber so as to permit prolonged and/or continuous operation of the combustion system before removal of char, biochar, clinkers, ash, soot, unburnt debris, etc., from the combustion chamber is required or necessary.

SUMMARY OF THE INVENTION

Wherefore, it is an object of the disclosure to overcome the above-mentioned shortcomings and drawbacks associated with the prior art incinerator apparatuses.

Another object is to provide a combustion/pyrolization system which can combust all types of feed material, e.g., both unprocessed and processed vegetative material and/or biomass, into char and biochar.

A further object is to provide a combustion/pyrolization system in which combustion air is supplied to the combustion/pyrolization chamber, both from the top/side of the combustion/pyrolization chamber as well as from the bottom portion of the combustion/pyrolization chamber, in order to increase and promote more efficient combustion/pyrolization of the material contained within the combustion/pyrolization chamber of the combustion/pyrolization system.

Yet another object is to preheat at least the second source of combustion air, being supplied to the bottom portion of the combustion/pyrolization chamber, prior to that second source of combustion air passing through the perforated grate and entering into the combustion chamber, so as to increase and promote more efficient combustion/pyrolization of the feed material contained within the combustion/pyrolization chamber of the combustion/pyrolization system.

A still further object is to provide the combustion/pyrolization apparatus with a perforated grate which permits periodic discharge of larger char and biochar particles, ash, clinkers, soot, unburnt debris, etc., during operation.

A further object is to provide the perforated grate with sufficiently large holes so as to permit sufficiently large particles of char and boichar to pass therethough and fall into the cooling medium or fluid contained within the char collection bin and thereby avoid the complete combustion of the char and boichar and assist with generation of char and boichar particles having a sufficient carbon content for subsequent use and processing.

Another object is to locate the char collection bin, containing a cooling medium or fluid, vertically below the perforated grate, forming the bottom of the combustion/pyrolization chamber, in which the char and biochar can fall into and be extinguished/quenched so as to discontinue further combustion/pyrolization of the char and boichar and thereby preserving as much carbon as possible in the generated char and boichar.

Still another object is to add a cooling medium or fluid, such as water, to the collection chamber of the char collection bin which assists with extinguishing or quenching the accumulating char and biochar.

A further object is to utilize a second source of combustion air, supplied to the bottom portion of the combustion/pyrolization chamber, to cool the base frame and components supported thereon so that the second source of combustion air is preheated prior to that combustion air passing through the perforated grate and entering into the combustion/pyrolization chamber.

The present disclose also relates to a combustion/pyrolization system for generating at least one of char and biochar, the combustion/pyrolization system comprising: an upper base frame supporting a combustion/pyrolization housing, and the combustion/pyrolization housing having both an open top end and an open bottom end; a char collection bin defining a collection chamber therein and a perforated grate normally covering the open top end of the char collection bin; the perforated grate being sized so as to permit desired sized char and/or biochar to pass therethrough into the collection chamber; and the open bottom end of the combustion/pyrolization housing of the upper base frame being movable into an engaged position in which a lower portion of the combustion/pyrolization housing partially receives and surrounds the perforated grate thereby to define a combustion/pyrolization chamber for receiving and consuming feed material and generating at least one of char and biochar, and the combustion/pyrolization housing of the upper base frame being movable out of engagement and spaced away from the perforated grate, to facilitate movement of the perforated grate and removal of the generated char and/or biochar from the collection chamber.

The present disclose also relates to a method of generating at least one of char and biochar in a combustion/pyrolization system for, the method comprising: supporting a combustion/pyrolization housing on an upper base frame, and forming the combustion/pyrolization housing to have both an open top end and an open bottom end; defining a collection chamber in a char collection bin and normally covering the open top end of the char collection bin with a perforated grate; sizing the perforated grate so as to permit desired sized char and/or biochar to pass therethrough into the collection chamber; and designing the open bottom end of the combustion/pyrolization housing of the upper base frame to be movable into an engaged position in which a lower portion of the combustion/pyrolization housing partially receives and surrounds the perforated grate thereby to define a combustion/pyrolization chamber for receiving and consuming feed material and generating at least one of char and biochar, and moving the combustion/pyrolization housing of the upper base frame out of engagement and spaced away from the perforated grate, to facilitate movement of the perforated grate and removal of the generated char and/or biochar from the collection chamber.

BRIEF DESCRIPTION OF THE DRAWINGS

The accompanying drawings, which are incorporated in and constitute a part of the specification, illustrate various embodiments of the invention and together with the general description of the invention and the detailed description of the drawings given below, serve to explain the principles of the invention. The invention will now be described, by way of example, with reference to the accompanying drawings in which:

FIG. 1 is a diagrammatic left side elevational view of the combustion/pyrolization system of the disclosure;

FIG. 2 is a diagrammatic front end elevational view of the combustion/pyrolization system of FIG. 1;

FIG. 3 is a diagrammatic left side elevational view of the combustion/pyrolization system of FIG. 1 with the base frame moved vertically upward away out of engagement with the char collection bin;

FIG. 4 is a diagrammatic front end elevational view of the combustion/pyrolization system of FIG. 2 with the base frame moved vertically upward away out of engagement with the char collection bin;

FIG. 5A is a diagrammatic cross sectional view of the combustion/pyrolization system of FIG. 1 showing the seal formed between the base frame and the char collection bin;

FIG. 5B is an enlarge diagrammatic cross sectional view of area 5B of FIG. 5A;

FIG. 6A is a diagrammatic top plan view of the combustion/pyrolization system of FIG. 1 diagrammatically showing the air flow from the first blower which forms an air curtain and assist with combustion/pyrolization of the feed material;

FIG. 6B is a diagrammatic end view of the combustion/pyrolization system of FIG. 1 diagrammatically showing the air flow from the first blower which forms an air curtain and assist with combustion/pyrolization of the feed material;

FIG. 6C is a diagrammatic top plan view of the combustion/pyrolization system of FIG. 1 diagrammatically showing the air flow from the second blower which supplies air flow in through the perforated grate to assist with combustion/pyrolization of the feed material;

FIG. 7 is a diagrammatic left side elevational view of a shorter embodiment of the combustion/pyrolization system of the disclosure;

FIG. 8 is a diagrammatic front end devotional view of the shorter embodiment of the combustion/pyrolization system of FIG. 7;

Figure 10:
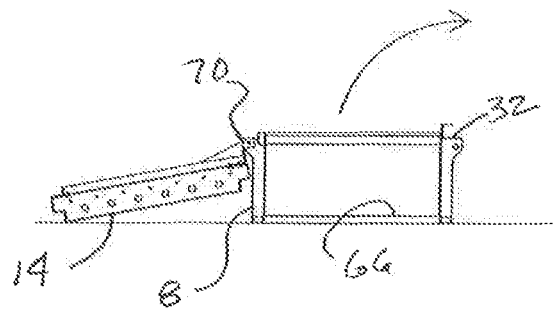
FIG. 10 is a diagrammatic front end elevational view of the char collection bin showing the perforated grate in its emptying position.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present disclosure.

Turning first to FIGS. 1-5B, a brief description concerning the various components of the combustion/pyrolization system 2 will now be discussed and this will be followed by a discussion concerning operation of the combustion/pyrolization system 2. As can be seen in this first embodiment, the present invention relates to the combustion/pyrolization system 2 which is transported to a desired location or site and then set up in order to facilitate partial or substantially complete combustion/pyrolization of the desired feed material 4, e.g., all types of material such forestry debris, vegetative debris, biomass, processed and unprocessed wood, chips, bark, ground wood and well as other materials such municipal solid waste (MSW). The combustion/pyrolization system 2 generally comprises two completely separate and distinct components, namely, a lower char collection bin 8 and an upper base frame 6 on which supports a combustion/pyrolization housing 12 as well as a number of additional elements of the system. As discussed in further detail below, when open bottom end the base frame 6 is lowered so that a bottom surface 10 of the combustion/pyrolization housing 12 (see FIG. 5B for example) engages with a perforated grate 14, which normally covers the open top of the char collection bin 8, the combustion/pyrolization housing 12 and the perforated grate 14 combine with one another define a combustion/pyrolization chamber 16, and the purpose of which will become apparent from the following description.

An engine 18, e.g., a 10-50 horsepower electric motor, is supported on the base frame 6, in a conventional manner, typically adjacent a leading first end 20 of the combustion/pyrolization system 2 (see FIGS. 6A and 6C). An output shaft of the engine 18 drives a hydraulic pump (not shown in detail) which pumps hydraulic fluid and thus generates a source of hydraulic pressure 22 for controlling operation of the combustion/pyrolization system 2, as will be discussed below in further detail.

As noted above, the base frame 6 supports the combustion/pyrolization housing 12 which generally comprises two opposed side walls 24 and two opposed end walls 26 (see FIG. 6C). The combustion/pyrolization housing 12 is completely open along both a top end 28 and a bottom end 30 thereof. The open top end 28 facilitates loading of material, such forestry debris, vegetative debris, biomass, processed and unprocessed wood, chips, bark, ground wood and NSW, into the combustion/pyrolization chamber 16 while the open bottom end 30 facilitates the bottom surface 10 of the base frame 6 surrounding the entire perimeter of the perforated grate 14 and forming a seal with the top surface 32 of the char collection bin 8. As briefly discussed above, when the open bottom end 30 of the base frame 6 is lowered into engagement with the top surface 32 of the char collection bin 8, then the perforated grate 14 is surrounded by a lower section of the combustion/pyrolization housing 12 and those two mating components combined with one another to define the combustion/pyrolization chamber 16.

As generally shown, the base frame 6 comprises upper and lower lateral horizontal supports 34, 36 as well as a plurality of spaced apart vertical supports 38 which are connected to and extend substantially normal between the upper and lower lateral horizontal supports 34, 36. Each one of the vertical supports 38 is spaced from an adjacent vertical support 38. The lateral horizontal supports 34, 36 and the vertical supports 38 together form a framework, which is part of the base frame 6, onto which various components of the combustion/pyrolization system 2 are secured or fastened.

Figure 11:
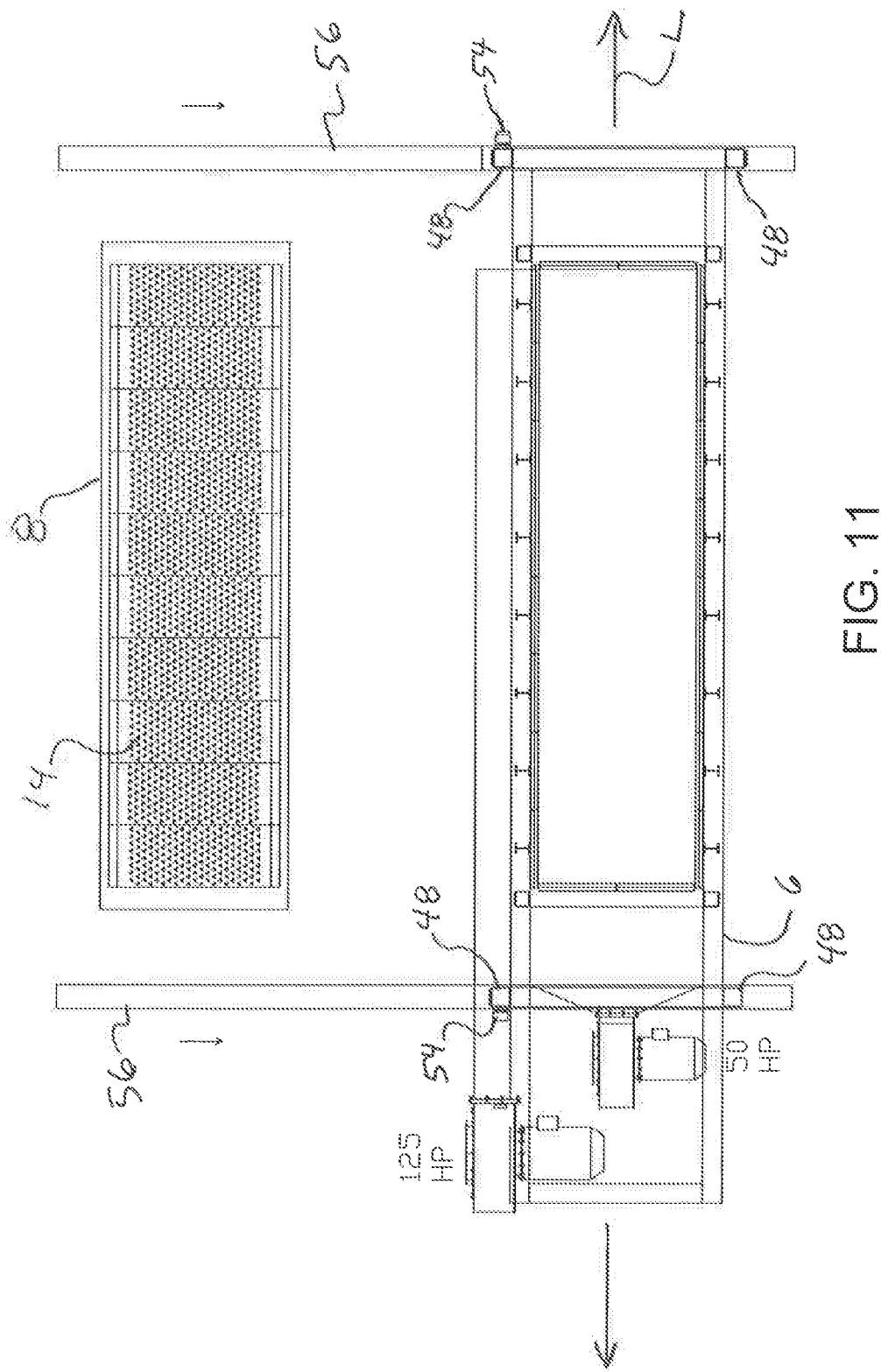
FIG. 11 is a diagrammatic top plan view of the combustion/pyrolization system of FIG. 3 diagrammatically showing lateral movement of the base frame, relative to the char collection bin, so that access to the char collection bin for emptying thereof is provided.
Figure 12:
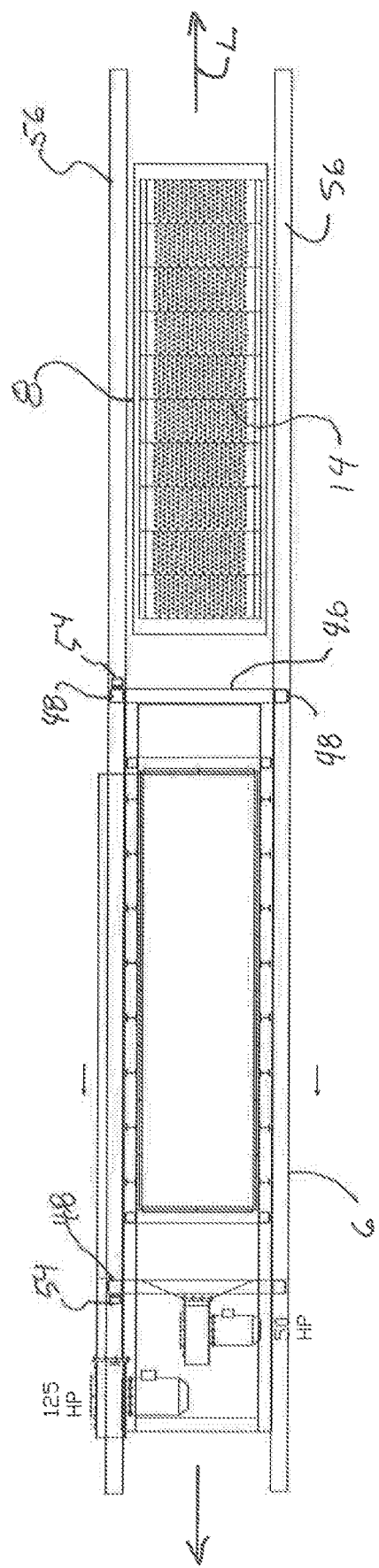
FIG. 12 is a diagrammatic top plan view of the combustion/pyrolization system of FIG. 3 diagrammatically showing axially movement of the base frame, relative to the char collection bin, so that access to the char collection bin for emptying thereof is provided.

A plurality of sidewall ceramic members 40, or some other refractory material, are typically secured, in a conventional manner, to one or more of the horizontal and/or vertical supports 34, 36, 38 of the base frame 6 in a side-by-side abutting relationship, as shown in FIGS. 11 and 12 fro example, along both of the opposed lateral sidewalls of the base frame 6. Each one of the sidewall ceramic members 40 is typically securely but releasably fastened, e.g., by conventional fasteners (not shown in detail), to the one or more horizontal and/or vertical supports 34, 36, 38 of the base frame 6. Such releasable attachment facilitates replacement and/or servicing of one or more of the sidewall ceramic members 40, in the event that one of the sidewall ceramic members 40 becomes cracked or is otherwise damaged.

As shown in FIGS. 11 and 12 for example, eight sidewall ceramic members 40 are arranged, side by side and closely adjacent one another, along each of the two opposed sidewalls of the combustion/pyrolization housing 12. Each one of these sidewall ceramic members 40, for example, has a height of between 60 and 100 inches, a width of between 30 and 60 inches and a thickness of between 2 and 4 inches.

In addition, two endwall ceramic members 42 are releaseably secured to the horizontal and/or vertical supports 34, 36, 38 of the base frame 6 along the endwall located at the first leading end 20 and along the endwall located at the second trailing end 46 of the combustion/pyrolization chamber 16 to facilitate replacement and/or servicing thereof. Each one of the endwall ceramic members 42 typically has, for example, a height of between 60 and 100 inches, a width of between 30 and 80 inches and a thickness of between 2 and 4 inches.

As noted above, the combustion/pyrolization chamber 16 is defined by the perforated grate 14, the plurality of sidewall ceramic members 40 arranged along each one of the first and second longitudinal sidewalls, and the endwall ceramic members 42. The open top end 28 provides access to the combustion/pyrolization chamber 16 and facilitates both the escape of combustion gases therefrom as well as loading of the additional feed material into the combustion/pyrolization chamber 16.

Figure 16:
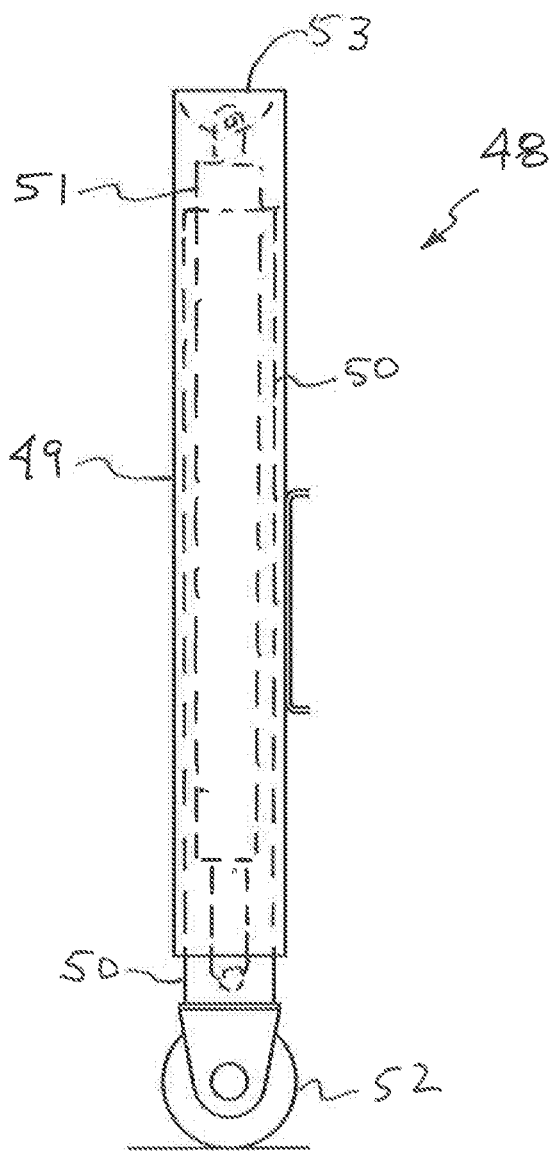
FIG. 16 is a diagrammatic front end elevational view of a hydraulically activated telescoping support leg which comprises an outer tube, a slidably extendible/retractable inner tube and an internally located hydraulic cylinder shown in broken lines.

Two pairs of hydraulically activated telescoping support legs 48 are permanently secured to the base frame 6 with a first pair of hydraulically activated telescoping support legs 48 being permanently secured, e.g., by welding, bolting, etc., adjacent the first leading end 20 of the base frame 6, i.e., one hydraulically activated telescoping support leg 48 being secured on each side thereof, and a second pair of hydraulically activated telescoping support legs 48 being permanently secured, e.g., by welding, bolting, etc., adjacent the second trailing end 46 of the base frame 6, i.e., one hydraulically activated telescoping support leg 48 being secured on each side thereof. Each one of the hydraulically activated telescoping support legs 48 comprises a respective outer tube 49 which is permanently secured to the base frame 6 and receives and accommodates a respective inner tube 50 which is slidably extendible/retractable so as to move relative to the outer tube 49. A base end of a hydraulic cylinder 51 (see the broken lines shown in FIG. 16) is connected to a base plate 53 of the outer tube 49, in a conventional manner, while a rod end of the hydraulic cylinder 51 is connected to or adjacent a remote end of the slidably extendible/retractable inner tube 50 which projects out from the outer tube 49.

As a result of this arrangement, when hydraulic fluid is supplied to a first side of the hydraulic cylinder 51, a length of the hydraulic cylinder 51 expands and the inner tube 50 is forced out of and away from the respective base plate 53 of the outer tube 49 so as to increase or extend the overall length of the hydraulically activated telescoping support leg 48. However, when hydraulic fluid is supplied to a second opposite side of the piston of the hydraulic cylinder 51, then a length of the hydraulic cylinder 51 decreases so that the inner tube 50 is pulled and retracted into and toward the base plate 53 of the outer cylinder so as to decrease or shorten the overall length of the hydraulically activated telescoping support leg 48 and shorten the length of the hydraulically activated telescoping support leg 48. Each one of the outer tubes 49 and the inner tubes 50 typically has a rectangular transverse cross section so as to retain a desired initially installed orientation and thereby avoid twisting, turning or rotation of the inner tube 50 relative to the outer tube 49 during the extendible/retractable movement.

According to the first embodiment, an outer most free end of each one of the respective inner tubes 50 supports a rotatable (metal) roller or wheel 52 which facilitates movement of the base frame 6. If the rotational axes of each one of the rollers or wheels 52 are all arranged so as to extend parallel to a longitudinal axis L of the combustion/pyrolization system 2, then this arrangement facilitates lateral movement of the base frame 6, in either direction, relative to the char collection bin 8, as shown in FIG. 11. On the other hand, if the rotational axes of each one of the rollers or wheels 52 are arranged so as to extend perpendicular to the longitudinal axis L of the combustion/pyrolization system 2, then this arrangement facilitates axial movement of the base frame 6, in either direction, relative to the char collection bin 8, as shown in FIG. 12. Simultaneous hydraulic actuation of the first and the second pairs of the hydraulically activated telescoping support legs 48 facilitates raising and lowering of the base frame 6 relative to the char collection bin 8, as discussed below in further detail, and thus can assist with loading of the combustion/pyrolization system 2 on to and off of a transportation trailer, as discussed below in further detail.

A hydraulic drive 54 is generally associated with at least two of the rollers or wheels 52 for supplying rotational driving power thereto. Each hydraulic drive 54 is coupled to the source of hydraulic pressure 22, by a hydraulic line (not shown in detail), to facilitate the supply of hydraulic fluid thereto and rotation of the associated roller or wheel 52 in a desired rotational direction. If lateral movement of the base frame 6, relative to the char collection bin 8, is to occur (see FIG. 11), then one of the inner tubes 50 supported at the first leading end and one of the inner tubes 50 supported on the same side at the second trailing end 46 of the combustion/pyrolization system 2, e.g., both of the inner tubes 50 supported on either the left side or the right side of the base frame 6, are each equipped with a respective hydraulic drive 54 for driving the associated roller or wheel 52. Alternatively, if axial movement of the base frame 6, relative to the char collection bin 8, is to occur (see FIG. 12), then each one of pair of the inner tubes 50 supported at either the first leading end 20 of the base frame 6 or the second trailing end 46 of the base frame 6 is equipped with a respective hydraulic drive 54 for driving the associated roller or wheel 52. To further assist with either axially or laterally movement of the base frame 6 relative to the char collection bin 8, the rollers or wheels 52 may roll along a pair of spaced apart guide pads or guide tracks 56 which facilitate reliably achieving the desired back and forth movement when emptying the char collection bin 8. As such hydraulic drives 54 and guide tracks 56 are conventional and well known in the art, a further discussion concerning the same is not provided.

A conventional first blower 58 is supported, in a conventional manner, by the base frame 6 adjacent the leading first end 20 of the combustion/pyrolization system 2. The first blower 58, when driven by an associated motor (e.g., 50-200 horsepower motor and more preferably a 125 horsepower motor), generates a first source of combustion air which assists with forming an air curtain as well as assists with combustion/pyrolization of the feed material 4. As diagrammatically shown in FIGS. 5A and 6A for example, an outlet end of the first blower 58 is connected to a tapered air manifold 60 which is arranged and extends along an upper first longitudinal edge of the combustion/pyrolization chamber 16. The tapered air manifold 60 is permanently secured to an upper horizontal support 34 which extends along the first longitudinal side of the base frame 6.

An internal transverse cross sectional area of the air manifold 60 typically gradually tapers, e.g., via internal baffles, from the leading first end which has a larger transverse cross sectional area to the trailing second end of the base frame 6, where the air manifold 60 terminates as a closed end, which has a smaller transverse cross sectional area. The air manifold 60 is designed to assist with uniformly discharging the supplied first source of combustion air laterally across the entire open top end 28 of the combustion/pyrolization chamber 16 and toward the opposite longitudinal sidewall of the combustion/pyrolization chamber 16 as diagrammatically shown in FIG. 6A, but at a slightly downwardly inclined air flow direction.

The air manifold 60 has a plurality of spaced apart outlets or elongate slits (not shown in detail) along the length thereof which are designed to discharge air completely across the open top end 28 of the combustion/pyrolization chamber 16. The first source of combustion air, exhausting from the plurality of outlets or elongate slits, is discharged so as to form a conventional "air curtain" which extends completely across the open top end 28 of the combustion/pyrolization chamber 16, i.e., from the first longitudinal sidewall to the opposed second longitudinal sidewall as well as from the leading first end wall to the trailing second end wall of the combustion/pyrolization chamber 16. This air curtains assists with and substantially prevents the escape of any significant amount of smoke, particulate matter, other air borne debris, etc., from the combustion/pyrolization chamber 16, during combustion, thereby resulting in relatively clean combustion/pyrolization of the feed material 4. As formation of such air curtain conventional and well known in the art, a further discussion concerning the same is not provided.

Once the first source of combustion air reaches the opposite side wall of the combustion/pyrolization chamber 16, the combustion air typically deflects downwardly off that opposite sidewall, due to the slight downwardly inclined air flow direction of the first source of combustion air (see FIG. 6B). The first source of combustion air continues flowing toward the bottom region of the combustion/pyrolization chamber 16 to provide additional combustion air for the feed material 4 combusting/pyrolizing within the combustion/pyrolization chamber 16 and thereby improves the overall combustion/pyrolization of the feed material 4.

A conventional second blower 62 is supported, in a conventional manner, by the base frame 6 also adjacent the leading first end 20 of the combustion/pyrolization system 2. The second blower 62, when driven by an associated motor (e.g., 20-100 horsepower motor and preferably a 50 horsepower motor), generates a second source of combustion air which assists with combustion/pyrolization of the feed material 4, as discussed below.

As shown in FIGS. 5A, 5B and 6C, an air plenum chamber 64 is located and extends horizontally along the lower region along each side of the base frame 6. An inlet is formed at the leading end of each branch of the plenum chamber 64 while a trailing end of each branch of the plenum chamber 64 terminates as a closed end. An outlet of the second blower 62 is connected to the inlet of each branch of the plenum chamber 64 for supplying the second source of combustion air thereto.

As generally shown in the drawings, a plurality of air discharge openings (not shown in detail) are formed axially along each branch of the air plenum chamber 64 for discharging heated second source of combustion air through a side of the perforated grate 14 and/or into the char collection bin 8, directly above the cooling medium or fluid 68. The air discharge openings, e.g., each opening typically measuring 2 inches by 4 inches, are spaced from one another, e.g., between about 2 feet or so apart from one another, generally along the entire length of each branch of the air plenum chamber 64.

As the second source of combustion air, from the second blower 62, is introduced and flows into and along the air plenum chamber 64. As this second source of combustion air flows through the air plenum chamber 64, this second source of combustion air assists with cooling of the base frame 6 as well as the lower portion of the combustion/pyrolization chamber 16.

As noted above, the second source of combustion air eventually exits from the air plenum chamber 64, via one of the air discharge openings, and flows into perforated grate 14 and/or the vertically uppermost region of the char collection bin 8 (directly above the cooling medium or fluid 68). As a result of this flow path, the second source of combustion air is, in turn, correspondingly heated so that this heated second source of combustion air can, thereafter, eventually flow up through the perforated grate 14 and into the combustion/pyrolization chamber 16 to assist with combustion of the feed material 4 being consumed therein.

As this heated second source of combustion air enters into the char collection bin 8, this heated air is typically dispersed throughout the uppermost region of the char collection bin 8. As noted above, this heated air then eventually flows up through one of the openings or apertures, formed in the perforated grate 14, to assist with combustion of the biomass material contained within the combustion/pyrolization chamber 16.

It is to be appreciated that this second source of combustion air also assists with cooling the base frame 6 of the combustion/pyrolization system 2 as well as other components, e.g., the source of hydraulic pressure 22, the engine 18, the first and second blowers 58, 62, etc., of the combustion/pyrolization system 2 so as to prevent the base frame 6 and those other components from overheating, particularly during prolonged operation of the combustion/pyrolization system 2.

Turning now to FIGS. 1-4, various features of the char collection bin 8 will now be discussed. As generally shown in those Figures, a base 69 of the char collection bin 8 defines a collection chamber 66 which is sized and shaped for collection of the generated char and boichar which gradually falls through the grate openings formed in the perforated grate 14. The base 69 generally comprises the bottom surface, two opposed end surfaces and two opposed side surfaces which together define the collection chamber 66. The base 69 of the char collection bin 8 may be fabricated from a metal, such as steel or stainless steel.

According to the first embodiment of FIGS. 1-4, the collection chamber 66 may, for example, have a length of about 26 feet and 8 inches or so, a width of about 6 feet and 9 inches or so, and a height of about three feet and 4 inches or so. According to the second embodiment—shown in FIGS. 7 and 8—the collection chamber 66 may, for example, have a shorter length of about 16 feet and 8 inches or so, a width of about 6 feet and 9 inches or so, and a height of about three feet and 4 inches or so. It is to be appreciated that the overall size and shape of the collection chamber 66 can vary, from application to application, so long as the collection chamber 66 is suitably sized for accommodating a desired amount of char and boichar which is generated by the combustion/pyrolization system 2.

During use, the char collection bin 8 is typically partially filled with a suitable cooling medium or fluid 68, such as cold water for example, to a level which is a few inches, e.g., 6 inches±4 inches, below a bottom surface of the perforated grate 14. This cooling medium or fluid 68 is designed to rapidly extinguish/quench each piece of char or biochar which falls through the grate openings of the perforated grate 14 into the cooling medium or fluid 68 accommodated within the char collection bin 8.

Figure 9:
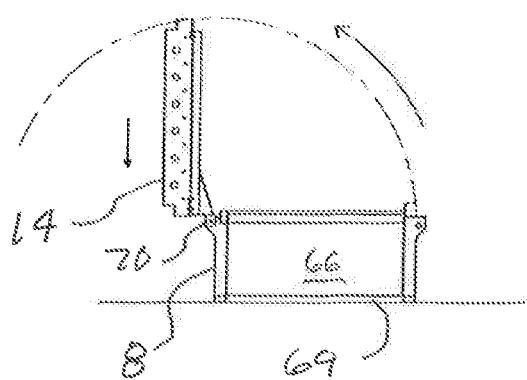
FIG. 9 is a diagrammatic front end elevational view of the char collection bin showing the perforated grate in a mid position between its operating position and the its emptying position.

As best shown in FIGS. 5A, 9 an 10, the perforated grate 14 is pivotably or hingedly attached by a hinge or pivoting mechanism 70 along a longitudinal side edge top surface 32 of the char collection bin 8 to facilitate rotational/pivoting movement of the perforated grate 14 between its normal operating position (see FIGS. 2, 4 and 5A for example) and its emptying position (see FIG. 10). In the normal operating position of the perforated grate 14, the perforated grate 14 is generally supported by the top surface 32 of the char collection bin 8. When the perforated grate 14 is in this position, the upper base frame 6 can be lowered onto the char collection bin 8, as discussed below in further detail, so as to form a suitable seal therebetween which prevents gases, material, etc., from escaping therebetween while still permitting any generated char and boichar to fall through the grate openings in the perforated grate 14 and collect and accumulate within the cooling medium or fluid 68 contained located within the char collection bin 8. A fiberglass rope or a fiberglass gasket 72, for example, may be secured to a bottom surface 10 of the upper base frame 6, as best shown in FIG. 5B. When the upper base frame 6 is lowered onto the top surface 32 of the char collection bin 8, the fiberglass rope or fiberglass gasket 72 is sandwiched between a bottom surface 10 of the base frame 6 and the top surface 32 of the char collection bin 8 and forms a seal.

The perforated grate 14 is typically fabricated from metal, such as steel or stainless steel, and the grating typically has a thickness of between ⅜ and 5 inches or so and may be mounted to a pivotable grate frame to assist with removal, cleaning, replacement and/or servicing of the perforated grate 14. The perforated grate 14 typically comprises a rectangular metallic grate frame on to which one or more replaceable grates are secured by conventional fasteners. Each grate of the perforated grate 14 has a plurality of spaced apart small openings, holes or apertures (see FIGS. 11 and 12 for example) formed therein, e.g., 1/16 to 6 inches holes and more preferably about ⅛-2 inch holes, which facilitate the smaller particles of char and biochar, etc., falling through grate openings of the perforated grate 14 and collecting within the char collection bin 8 while the larger particles of ash and the larger char, biochar, clinkers, soot, unburnt debris, etc., are prevented from passing through and accumulate on the top surface of perforated grate 14. As noted above, the small openings, holes or apertures, formed in the perforated grate 14, also facilitate the supply of the second source of combustion air up through plurality of equally spaced small openings, holes or apertures into the combustion/pyrolization chamber 16, as will be described below in further detail.

In the event that one of grate sections or the entire perforated grate 14 deteriorates or becomes sufficiently worn or damaged during use, the perforated grate 14 may be disconnected and removed from the char collection bin 8, by disconnecting the grate frame from the hinge or pivoting mechanism 70 or disconnecting the both the grate frame and the hinge or pivoting mechanism 70 from the char collection bin 8. Thereafter, the deteriorated or damaged grate(s) is further disassembled, in a conventional manner, and replaced with one or more replacement grate(s). Alternatively, the perforated grate 14 may be replaced with a completely new perforated grate having either smaller sized or larger sized openings therein to facilitate passage of either smaller or larger sized particles of generated char and biochar from the combustion/pyrolization chamber 16 into the char collection bin 8. Finally, the grate frame with the replaced grates or the different size grates, and possibly also the hinge or pivoting mechanism 70, is again reinstalled on the char collection bin 8, in a conventional manner, for further use.

Once the char collection bin 8 becomes sufficiently filled with generated char and biochar, or other servicing thereof becomes necessary, then the perforated grate 14 is pivoted, about the hinge or pivoting mechanism 70, from its operating position into its emptying position, shown in FIG. 10, where access to the generated char and/or biochar can be achieved. It is to be appreciated that the perforated grate 14 may be pivoted, from its operating position into its emptying position and vice verse, by conventional equipment, such as a fork truck, a front end loader, an excavator, a hoist, etc., (not shown). As discussed below in further detail, in order for this to occur, first the base frame 6 must be elevated or moved vertically relative to the char collection bin 8 in order to space and separate the bottom surface 10 of the base frame 6 sufficiently from the perforated grate 14 of the char collection bin 8 (see FIGS. 3 and 4 for example). Next, the base frame 6 must be moved, e.g., laterally (see FIG. 11) or axially (see FIG. 12), relative to the char collection bin 8 or the char collection bin 8 must be laterally moved, e.g., laterally (see FIG. 13) or axially (not shown), relative to the base frame 6 by operation of the hydraulic drives 54 to drive the associated rollers or wheels 52 by conventional equipment so that the base frame 6 is no longer located vertically above the char collection bin 8 and access to the collection chamber 66 of the char collection bin 8 is achieved. Lastly, the perforated grate 14 must be moved, about its pivotable or hinge attachment 70, relative to the base 69 of the char collection bin 8 into its emptying position shown in FIG. 10. A further description concerning the relative lateral or axial movement of the base frame 6 relative to the char collection bin 8 is provided below.

It is to be appreciated that during such pivoting movement of the perforated grate 14, from the operating position into the emptying position, any larger particles of char, biochar, ash, clinkers, soot, unburnt debris, which are located on the top surface of the perforated grate 14, are moved, along with the perforated grate 14, and dumped onto the ground or some other surface located adjacent the char collection bin 8. After emptying and removal of the generated char and biochar from the char collection bin 8 via an excavator, for example, or some other equipment or technique, the perforated grate 14 is then moved, about its pivotable or hinge attachment 70 relative to the base 69 of the char collection bin 8, back into its operating position (shown in FIG. 4 for example) to commence generation of a new batch of char or biochar. The collected char and biochar, can then be further processed, mixed with fertilizer or an additive(s), transported to another site for further processing, discharged into the soil, etc. Thereafter, the larger particles of char, biochar, ash, clinkers, soot, unburnt debris are then extinguished and properly disposed of.

If desired, the inner surface of the collection chamber 66 may be lined with a durable metal screen liner (not shown) to assist with removing all of the generated char and biochar from the char collection bin 8. When the durable metal screen liner is lifted and removed from the char collection bin 8 by conventional equipment, the durable metal screen liner supports and removes substantially all of the generated char and boichar while still being porous enough to permit substantially all of the cooling medium or fluid 68 to drain through the durable metal screen liner and remain within the char collection bin 8. Once the generated char and boichar is emptied and removed from the durable metal screen liner, the durable metal screen liner is then reinstalled back in the char collection bin 8 to facilitate collection and removal of additional batch of generated char and biochar.

It is to be appreciated that the cooling medium or fluid 68 may have one or more conventional additive(s) or nutrient(s) added thereto, e.g., fertilizer. It is to be appreciated that the fertilizer may be either added to the cooling medium or fluid 68 or mixed with the smaller particles of the char and biochar, etc., after the same is removed from the char collection bin 8. The additive may be a nutrient mixer of nitrogen, phosphorous, potassium, and/or the like. The additives may be used in varying proportions, dependent upon the particular application, in order to provide customized enrichment of the soil.

Figure 13:
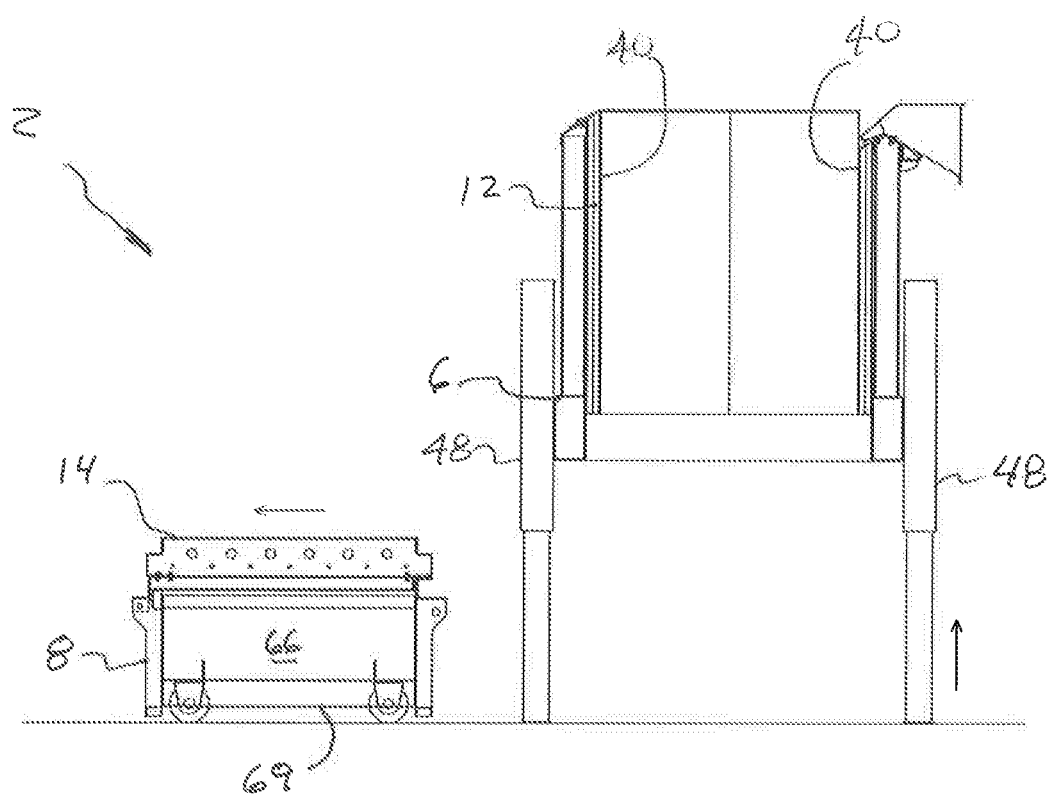
FIG. 13 is a diagrammatic front end elevational view of the combustion/pyrolization system of FIG. 3 diagrammatically showing lateral movement of the char collection bin, relative to the base frame, so that access to the char collection bin for emptying thereof is provided.

Turning now to FIG. 13, a still further embodiment of the combustion/pyrolization system according to the disclosure is shown. According to this embodiment, the base frame 6 is generally stationary and is merely able to move up and down via actuation of the hydraulically activated telescoping support legs 48—e.g., free end of each one of the respective inner tubes 50 does not have any rotatable roller or wheel affixed thereto. The rollers or wheels 50, however, are located on an undersurface of the base 69 of the char collection bin 8 instead of at the free end of the inner tubes 50 and typically the rollers or wheels 52 are not powered.

According to this embodiment, once the char collection bin 8 becomes sufficiently filled with generated char and biochar, or other servicing thereof becomes necessary, the further feeding of feed material 4 is discontinued. After the combustion rate has sufficiently decreased, then the base frame 6 is elevated or moved vertically relative to the char collection bin 8 (see FIGS. 3 and 4), by actuation of the hydraulically activated telescoping support legs 48, in order to space and separate the bottom surface 10 of the base frame 6 sufficiently away from the perforated grate 14 of the char collection bin 8. Next, the char collection bin is typically moved, pushed or pulled by equipment away from the base frame 6, e.g., laterally (see FIG. 13) or axially (not shown), so that the char collection bin 8 is no longer located vertically underneath the base frame 6 and access to the collection chamber 66 of the char collection bin 8 is achieved.

Figure 14:
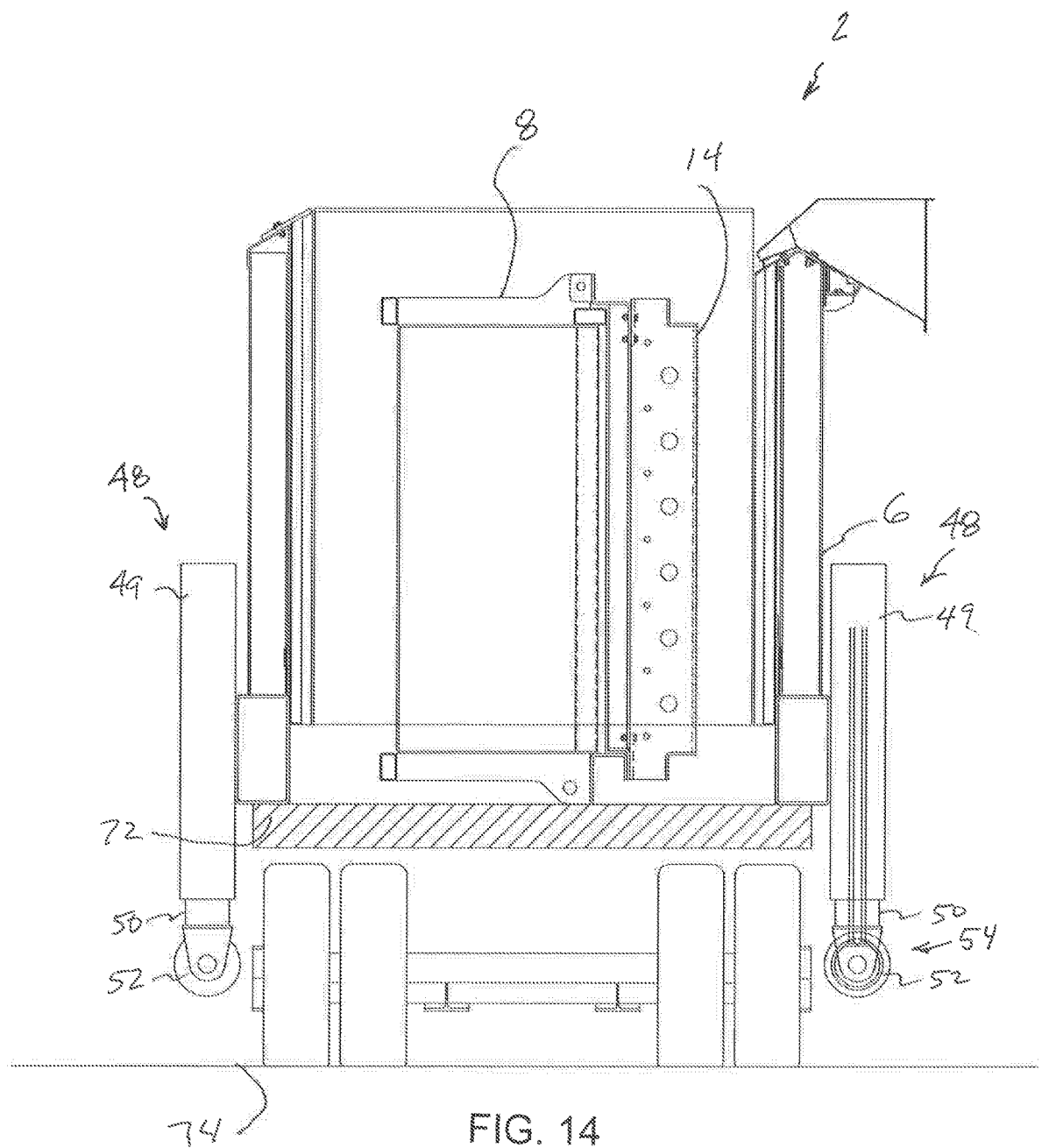
FIG. 14 is a diagrammatic front end elevational view of the combustion/pyrolization system of FIG. 1 diagrammatically showing the base frame loaded on a conventional trailer, for transportation thereof to a desired installation site, with the char collection bin placed inside the base frame.

In the event that transportation of the combustion/pyrolization system 2 to another location is desired, then the hydraulically activated telescoping support legs 48 are actuated to raise the base frame 6 out of engagement with the char collection bin 8 until the bottom surface 10 of the base frame 6 is located sufficiently vertically above and clears the top surface 32 of the char collection bin 8. Next, the hydraulic drives 54 are actuated to move the base frame 6, e.g., laterally (see FIG. 11) or axially (see FIG. 12), relative to the char collection bin 8 (or vice versa) so that the base frame 6 is no longer located vertically above or over the char collection bin 8 and accessible. Thereafter, a conventional trailer bed 72 can be backed in between the two pairs of the hydraulically activated telescoping support legs 48, as generally shown in FIG. 14. Next, the hydraulically activated telescoping support legs 48 are actuated to raise each one of the respect inner tubes 50 until they are generally completely retracted and located well above the ground, pavement or other surface 74. Finally, the char collection bin 8 can be loaded inside the combustion/pyrolization housing 12, by conventional loading equipment, so as to rest on a top surface of the trailer bed 74, as shown in FIG. 14. If desired, the char collection bin 8 can be braced with respect to the inner surface of the combustion/pyrolization housing 12 to resist tipping or tilting movement thereof during transport. At the desired destination, the above process is then generally reversed in order to reassembly the combustion/pyrolization system 2 for generation of char and boichar.

Figure 15:
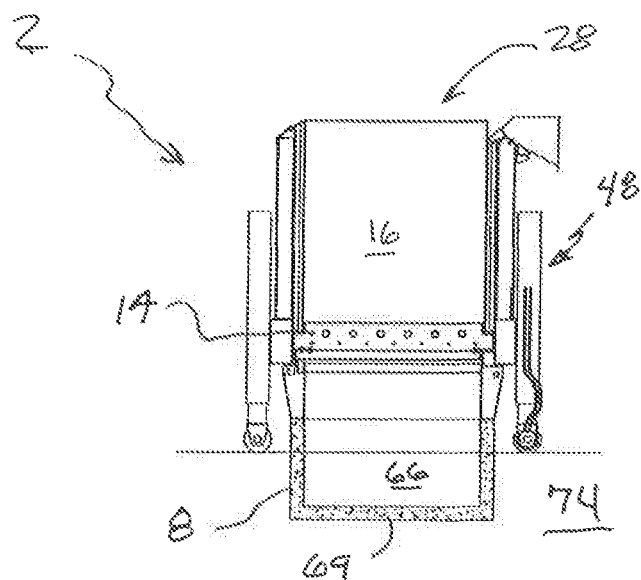
FIG. 15 is a diagrammatic front end elevational view of another embodiment of the combustion/pyrolization system in which the char collection bin is embedded into the ground, or some other surface, and the base frame is movable relative thereto for providing access to the char and boichar contained within the char collection bin.

Another embodiment of the combustion/pyrolization system is shown in FIG. 15. According to this embodiment, the char collection bin 8 is permanently supported/embedded into the ground 74, or some other surface, for collection of the generated char and biochar. In order to empty the char collection bin 8, once it is sufficiently filled with the generated char and biochar, the base frame 6 is movable relative thereto, as noted above, to provide access to the char and boichar contained within the char collection bin 8 and then the char and/or biochar is removed, as described above.

Operation of the Combustion/Pyrolization System

The combustion/pyrolization system 2 is typically transported to a desired destination or site and unloaded. Next, the char collection bin 8 is moved to a desired location and the hydraulic drives 54 are operated to position the base frame 6 directly above or over the char collection bin 8. Once this occurs, the hydraulically activated telescoping support legs 48 are then actuated to lower the base frame 6 toward the char collection bin 8 until the bottom surface 10 of the combustion/pyrolization housing 12 engages with the top surface 32 of the char collection bin 8 and forms a desired seal therebetween. It is to be appreciated that the base frame 6 and/or the char collection bin 8 may be equipped with guide features (not shown) to assist with guiding the open bottom end 30 of the combustion/pyrolization housing 12 into the desired engagement with the perforated grate 14. As a result of such movement, the perforated grate 14, which covers the open top of the char collection bin 8, and the combustion/pyrolization housing 12 combine with one another to define the combustion/pyrolization chamber 16. Thereafter, feed material 4 can be loaded within the combustion/pyrolization chamber 16 and combustion can commence in order to generate the desired char and biochar.

Following continuous combustion of the feed material 4, conventional loading equipment can then be periodically utilized to add additional feed material 4, as necessary or desired, to the combustion/pyrolization chamber 16 via the open top end 28 of the combustion/pyrolization chamber 16. This process of periodically feeding additional feed material 4 into the combustion/pyrolization chamber 16 continues until either a sufficient amount of the smaller particles of char, biochar, ash, clinkers, soot, unburnt debris, etc., accumulates on the top surface of the perforated grate 14 or a sufficient amount of char and biochar is generated in the char collection bin 8.

Once the char collection bin 8 becomes sufficiently filled with the generated char and biochar, or other servicing thereof becomes necessary, the further feeding of feed material 4 is discontinued and the combustion rate gradually decreases. After the combustion rate has sufficiently decreased, then the base frame 6 is elevated or moved vertically relative to the char collection bin 8 (see FIGS. 3 and 4), by actuation of the hydraulically activated telescoping support legs 48, in order to space and separate the bottom surface 10 of the base frame 6 sufficiently away from the perforated grate 14 of the char collection bin 8. Next, the hydraulic drives 54 are actuated to move the base frame 6, e.g., laterally (see FIG. 11) or axially (see FIG. 12), relative to the char collection bin 8 or possibly the char collection bin 8 is moved laterally moved, e.g., laterally (see FIG. 13) or axially (not shown), relative to the base frame 6 so that the base frame 6 is no longer located vertically above the char collection bin 8 and access to the collection chamber 66 of the char collection bin 8 is achieved.

Next, then the perforated grate 14 is pivoted, about the hinge or pivoting mechanism 70, from its operating position relative to the base 69 of the char collection bin 8 into its emptying position, shown in FIG. 10, where access to the generated char and/or biochar can be achieved. It is to be appreciated that the perforated grate 14 may be pivoted, from its operating position into its emptying position and vice verse, by conventional equipment, such as a fork truck, a front end loader, an excavator, a hoist, etc. Once the generated char and/or biochar is removed from the collection chamber 66 of the char collection bin 8, then the process is reversed in order to commence production of char and/or biochar again.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, I claim:

1. A combustion/pyrolization system for generating at least one of char and biochar, the combustion/pyrolization system comprising:

an upper base frame supporting a combustion/pyrolization housing, and the combustion/pyrolization housing having both an open top end and an open bottom end;

a char collection bin defining a collection chamber therein and a perforated grate normally covering the open top end of the char collection bin;

the perforated grate being sized so as to permit desired sized char and/or biochar to pass therethrough into the collection chamber; and the open bottom end of the combustion/pyrolization housing of the upper base frame being movable into an engaged position in which a lower portion of the combustion/pyrolization housing partially receives and surrounds the perforated grate thereby to define a combustion/pyrolization chamber for receiving and consuming feed material and generating at least one of char and biochar, and the combustion/pyrolization housing of the upper base frame being movable out of engagement and spaced away from the perforated grate, to facilitate movement of the perforated grate and removal of the generated char and/or biochar from the collection chamber, wherein two pairs of hydraulically activated telescoping support legs are secured to the base frame with a first pair of hydraulically activated telescoping support legs being secured adjacent cone end of the base frame and a second pair of hydraulically activated telescoping support legs being secured adjacent an opposite end of the base frame, and each hydraulically activated telescoping supporting accommodates respective extendible/retractable inner tube which is movable relative to a respective outer tube, by a respective hydraulic cylinder, for raising and lowering the base frame.

2. The combustion/pyrolization system according to claim 1, wherein, when hydraulic fluid is supplied to a first side of the respective hydraulic cylinder, the inner tube is forced out of and away from a base of the outer tube to increase an overall length of the hydraulically activated telescoping support leg, while when hydraulic fluid is supplied to a second side of the respective hydraulic cylinder, the inner tube is retracted into and toward the base of the outer tube to decrease the overall length of the hydraulically activated telescoping support leg.

3. The combustion/pyrolization system according to claim 2, wherein an outer most free end of each one of the respective inner tubes supports a rotatable wheel which facilitates movement of the base frame.

4. The combustion/pyrolization system according to claim 3, wherein a hydraulic drive is associated with at least two of the wheels for supplying rotational driving power thereto and facilitating one of axial and lateral movement of the base frame relative to the char collection bin, and each one of the hydraulic drives is coupled to the source of hydraulic pressure to facilitate the supply of hydraulic fluid thereto and rotation of the associated wheel in a desired rotational direction.

5. The combustion/pyrolization system according to claim 4, wherein rotational axes of each one of the wheels are arranged so as to extend parallel to a longitudinal axis of the combustion/pyrolization system and facilitate lateral movement of the base frame relative to the char collection bin.

6. The combustion/pyrolization system according to claim 4, wherein rotational axes of each one of the wheels are arranged so as to extend perpendicular to a longitudinal axis of the combustion/pyrolization system and facilitate axial movement of the base frame relative to the char collection bin.

7. The combustion/pyrolization system according to claim 4, wherein each outer tube and its respective inner tube has a rectangular transverse cross section so as to retain a desired orientation of the respective inner tube and avoid twisting, turning or rotation of the inner tube relative to the respective outer tube during the extendible/retractable movement.

8. The combustion/pyrolization system according to claim 2, wherein a bottom surface of the char collection bin supports a plurality of wheels which facilitate one of axial and lateral movement of the char collection bin relative to the base frame.

9. The combustion/pyrolization system according to claim 1, wherein a first blower is supported the base frame for generating a first source of combustion air, an outlet of the first blower is connected to an air manifold which is arranged along an upper first longitudinal edge of the combustion/pyrolization chamber, and the air manifold assists with uniformly discharging the supplied first source of combustion air laterally across the open top end of the combustion/pyrolization chamber to assist with forming an air curtain as well as combustion/pyrolization of the feed material.

10. The combustion/pyrolization system according to claim 1, wherein a second blower is supported by the base frame for generating a second source of combustion air, an air plenum chamber extends along a lower region along each side of the base frame the air plenum chamber is coupled to receive the second source of combustion air from the second blower, and the air plenum chamber discharges heated second source of combustion air so that some of that air passes up through the perforated grate and enters into the combustion/pyrolization chamber to assist with combustion.

11. The combustion/pyrolization system according to claim 10, wherein the second source of combustion air, from the second blower, is heated due to passing through the air plenum chamber and this assists with cooling the base frame and prevents overheating of the base frame and support components.

12. The combustion/pyrolization system according to claim 1, wherein the combustion/pyrolization housing comprises two opposed side walls and two opposed end walls, and the combustion/pyrolization housing is open along a top end thereof to facilitate loading of material into the combustion/pyrolization chamber.

13. The combustion/pyrolization system according to claim 1, wherein the base frame comprises supports which form a framework, and sidewall and endwall ceramic members are releaseably secured thereto so as to facilitate at least one of replacement and servicing thereof.

14. The combustion/pyrolization system according to claim 1, wherein an engine, supported on the base frame, drives a hydraulic pump to generate a source of hydraulic pressure for controlling operation of the combustion/pyrolization system.

15. The combustion/pyrolization system according to claim 1, wherein a base of the char collection bin defines the collection chamber which is sized and shaped for collection of the generated char and boichar which gradually falls through grate openings of the perforated grate into the collection chamber.

16. The combustion/pyrolization system according to claim 1, wherein, during operation, the collection chamber of the char collection bin is partially filled with a cooling medium which is designed to extinguish/quench the char and/or biochar which falls through the grate openings of the perforated grate into the char collection bin.

17. The combustion/pyrolization system according to claim 1, wherein the perforated grate is attached, by a hinge mechanism, to a top surface of the char collection bin to facilitate pivoting movement of the perforated grate between a normal operating position, where the perforated grate is supported by the top surface of the char collection bin, and an emptying position, where the perforated grate is pivoted away from the top surface of the char collection bin to facilitate emptying of the char and/or biochar which collects in the collection chamber.

18. The combustion/pyrolization system according to claim 1, wherein the cooling medium has at least one additive or nutrient added thereto.

19. A method of generating at least one of char and biochar in a combustion/pyrolization system for, the method comprising:
supporting a combustion/pyrolization housing on an upper base frame, and forming the combustion/pyrolization housing to have both an open top end and an open bottom end;
defining a collection chamber in a char collection bin and normally covering the open top end of the char collection bin with a perforated grate;
sizing the perforated grate so as to permit desired sized char and/or biochar to pass therethrough into the collection chamber; and
designing the open bottom end of the combustion/pyrolization housing of the upper base frame to be movable into an engaged position in which a lower portion of the combustion/pyrolization housing partially receives and surrounds the perforated grate thereby to define a combustion/pyrolization chamber for receiving and consuming feed material and generating at least one of char and biochar, and moving the combustion/pyrolization housing of the upper base frame out of engagement and spaced away from the perforated grate, to facilitate movement of the perforated grate and removal of the generated char and/or biochar from the collection chamber,
wherein two pairs of hydraulically activated telescoping support legs are secured to the base frame with a first pair of hydraulically activated telescoping support legs being secured adjacent cone end of the base frame and a second pair of hydraulically activated telescoping support legs being secured adjacent an opposite end of the base frame, and each hydraulically activated telescoping supporting accommodates respective extendible/retractable inner tube which is movable relative to a respective outer tube, by a respective hydraulic cylinder, for raising and lowering the base frame.

* * * * *